US011905722B2

(12) United States Patent
Sturm (10) Patent No.: US 11,905,722 B2
(45) Date of Patent: Feb. 20, 2024

(54) LOWERING SYSTEM AND SUPPORT DEVICE, AND CEILING FORMWORK HAVING SUCH A LOWERING SYSTEM (71) Applicant: PERI SE, Weissenhorn (DE)

(72) Inventor: Florian Sturm, Unterroth (DE)

(73) Assignee: PERI SE, Weissenhorn (DE)

( * ) Notice: Subject to any disclaimer, the term of this patent is extended or adjusted under 35 U.S.C. 154(b) by 506 days.

(21) Appl. No.: 16/979,514

(22) PCT Filed: Mar. 4, 2019

(86) PCT No.: PCT/DE2019/100191
§ 371 (c)(1),
(2) Date: Sep. 9, 2020

(87) PCT Pub. No.: WO2019/170192
PCT Pub. Date: Sep. 12, 2019

(65) Prior Publication Data
US 2020/0407991 A1 Dec. 31, 2020

(30) Foreign Application Priority Data
Mar. 9, 2018 (DE) ...................... 10 2018 203 612.8

(51) Int. Cl.
*F16M 11/00* (2006.01)
*E04G 25/04* (2006.01)
(Continued)

(52) U.S. Cl.
CPC ........... *E04G 25/04* (2013.01); *E01D 19/125* (2013.01); *E01D 21/065* (2013.01); *E04B 1/003* (2013.01);
(Continued)

(58) Field of Classification Search
CPC ....... E04G 25/04; E04G 11/48; E04G 11/483; E04G 11/486; E04G 11/50; E04G 17/16;
(Continued)

(56) References Cited

U.S. PATENT DOCUMENTS 3,815,858 A 6/1974 Mocny
7,708,251 B2 * 5/2010 Watt ...................... B62K 19/36
248/407
(Continued)

FOREIGN PATENT DOCUMENTS

AT 327503 B 2/1976
DE 3874172 T5 3/1993
(Continued)

*Primary Examiner* — Amy J. Sterling
(74) *Attorney, Agent, or Firm* — SLEMAN & LUND LLP (57) ABSTRACT A lowering system for lowering ceiling formworks during the removal of formworks of a building ceiling, comprising a reciprocating piston and a support base, and a locking device, wherein the reciprocating piston is slidably mounted in the support base, and can be pushed from an extended working position to a lowered position, and can be locked in the extended position by means of the locking device. The locking device has a pivot bearing and an eccentric lever, wherein the eccentric lever is rotatably mounted in the pivot bearing, and the reciprocating piston and the support base are supported against each other in the working position by means of the eccentric lever.

19 Claims, 5 Drawing Sheets (51) Int. Cl.
| | |
|---|---|
| *E01D 21/06* | (2006.01) |
| *E04G 11/48* | (2006.01) |
| *E04G 17/16* | (2006.01) |
| *E04G 11/50* | (2006.01) |
| *E01D 19/12* | (2006.01) |
| *E04B 1/00* | (2006.01) |
| *F16M 13/02* | (2006.01) |
| *E01D 101/24* | (2006.01) |
| *E04G 11/38* | (2006.01) |
| *E04G 25/00* | (2006.01) |

(52) U.S. Cl.
CPC ............ *E04G 11/48* (2013.01); *E04G 11/483* (2013.01); *E04G 11/486* (2013.01); *E04G 11/50* (2013.01); *E04G 17/16* (2013.01); *F16M 13/022* (2013.01); *E01D 2101/24* (2013.01); *E04G 11/38* (2013.01); *E04G 2025/003* (2013.01); *E04G 2025/006* (2013.01); *E04G 2025/045* (2013.01); *F16M 2200/021* (2013.01); *F16M 2200/025* (2013.01)

(58) Field of Classification Search
CPC ............... E04G 11/38; E04G 2025/003; E04G 2025/006; E04G 2025/045; E01D 19/125; E01D 21/065; E01D 2101/24; E04B 1/003; F16M 13/022; F16M 2200/021; F16M 2200/025

See application file for complete search history.

(56) References Cited

U.S. PATENT DOCUMENTS

| | | | |
|---|---|---|---|
| 11,505,440 B1* | 11/2022 | Christensen | B66F 13/00 |
| 2015/0308612 A1* | 10/2015 | Chen | F16M 11/22 |
| | | | 248/352 |
| 2020/0407990 A1* | 12/2020 | Moss | E04G 25/08 |

FOREIGN PATENT DOCUMENTS

| | | |
|---|---|---|
| DE | 202012009619 U1 | 11/2012 |
| DE | 102015223762 A1 | 6/2017 |
| GB | 1102423 | 2/1968 |
| GB | 2344609 | 6/2000 |
| KR | 20070001483 | 1/2007 |

\* cited by examiner

LOWERING SYSTEM AND SUPPORT DEVICE, AND CEILING FORMWORK HAVING SUCH A LOWERING SYSTEM

FIELD OF THE INVENTION

The invention relates to a lowering device for the construction sector, in particular for lowering ceiling formworks when dismantling the formwork from a structure ceiling. The lowering device has a lifting piston, a support base and a locking apparatus, the lifting piston being slidably mounted in the support base and being able to be slid into the support base from a pushed-out position into a lowered position. The lifting piston can be locked in the pushed-out position by means of the locking apparatus. The invention further relates to a support apparatus and to a ceiling formwork having a lowering device of this kind.

BACKGROUND OF THE INVENTION

To cast building parts, e.g. structure ceilings, in concrete, the shape thereof is first specified by a form lining that recreates the surface of the building part. The form lining is typically formed by formwork elements in the form of simple formwork panels or what are known as framed formwork elements, which generally have a steel or aluminum frame.

In the case of structure ceilings, the form lining is supported by means of propping elements or support apparatuses. By way of example, support apparatuses of this kind may be construction struts, which are often in the form of telescopic uprights, supporting scaffolds and/or truss-outs. Once the concrete has been cast, the ceiling formwork formed by the formwork elements and the support apparatuses are under load, i.e. the weight of the structure ceiling is supported on the structure ceiling formwork, in particular on the support apparatus(es). When dismantling the formwork from the at least partly cured structure ceiling, i.e. when removing the structure ceiling formwork once the structure ceiling concrete has set, said load means that the parts of the structure ceiling formwork are very difficult to release. To avoid this, it is known to integrate lowering devices into the support apparatuses, which devices make it possible to lower the formwork elements a few centimeters from the surface of the structure ceiling by actuating the formwork-dismantling mechanism of the lowering devices, so as to relieve the contact pressure on the propping elements.

To rapidly lower concrete formwork under load, the lowering device should be able to be actuated (released) in a practically load-free manner, i.e. without any exertion of force. In generic lowering devices, the locking apparatus is similar to a telescopic upright, e.g. is formed by a pin or a wedge, which fixes the lifting piston in the working position, i.e. prevents it from sliding in the support base. In the process, the lifting piston is supported on the support base by means of the pin or wedge. To release the formwork-dismantling mechanism, the wedge or pin is released, i.e. removed, such that the slidability of the lifting piston is restored. As a result, the lifting piston can be transferred automatically from the working position into the lowered position, under the effect of gravity.

Once the concrete of the structure ceiling has been cast and has set, however, the formwork and the structure ceiling exert a high contact pressure on the pin or wedge to be released, as a result of which it is generally very difficult to remove the pin or wedge from their functional position fixing the lifting piston in place and doing so requires a high exertion of force. For instance, when lowering the ceiling formwork it is relatively difficult to release the propping element as required to dismantle the ceiling formwork. Without tools, e.g. blows of a hammer, levers or a mobile hydraulics unit, it is generally impossible to activate the lowering mechanism in the known lowering devices. Uncontrolled hammer blows when releasing the propping elements may lead to functional impairments and potentially even to premature failure of the component (abrasive wear). In general, therefore, the propping-element releasing process to be carried out before the formwork can then be fully dismantled leads to significant staffing and time requirements.

SUMMARY OF THE INVENTION

Therefore, the object of the invention is to provide a lowering device, a support apparatus and a ceiling formwork that mitigates the disadvantages of the prior art, with the aim in particular of allowing ceiling formwork under load to be lowered, i.e. dismantled, as simply and as quickly as possible.

According to the invention, the object in relation to the lowering device is achieved by a lowering device, the support apparatus according to the invention, and the ceiling formwork according to the invention.

The lowering device according to the invention is particularly well-suited for support apparatuses in the construction sector and for lowering ceiling formwork when dismantling formwork from a structure ceiling. The lowering device has a lifting piston, which in particular forms a support head at one end, and a support base and a locking apparatus. The lifting piston is slidably mounted in the support base and can be slid into the support base from a pushed-out supporting or working position into a lowered position, and can be locked in the pushed-out working position by means of the locking apparatus.

According to the invention, the locking apparatus has a pivot bearing and an eccentric lever, the eccentric lever being rotatably secured in the pivot bearing, and the lifting piston and the support base being supported against one another in the working position by means of the eccentric lever. Due to the lifting piston and support base being supported against one another, the lifting piston can be locked in its position disengaged from the support base, i.e. its forward-stroke position. In eccentric levers, the center of gravity of the lever is located outside the rotary spindle of the pivot bearing of the lever. In the working position, the eccentric lever is positioned such that its center of gravity is positioned between the rotary spindle of the pivot bearing and the lifting piston. In this way, for example, the lifting piston, which is supported by means of, i.e. on, the eccentric lever, is in an unstable equilibrium. An unstable equilibrium can be destroyed by even just a slight deflection. Accordingly, the lifting piston can be slid into the lowered position by turning the eccentric lever away with just a slight exertion of force, even when under load. The pivot bearing can be formed on both the support base and the lifting piston. Accordingly, the eccentric lever can be rotatably secured to both the support base and the lifting piston. The eccentric lever can be formed, for example, similarly to a cam of a camshaft. In the working position, a cam of this kind can be supported on a supporting region that bulges out in the cam direction, e.g. in line with a ball surface. Using a lowering device according to the invention, it is thus possible to activate the lowering device under load in a simple and rapid manner, and thus to lower the loaded ceiling formwork.

By forming the lowering device according to the invention in the form of a telescopic stay, having a lifting piston that has a support head, the lowering device according to the invention is easy to integrate in or couple to a wide variety of propping elements or support apparatuses. The lowering device according to the invention has a simple principle of operation, which can be applied to a large number of propping elements. It enables significant time savings when dismantling the formwork from concrete ceilings, and thus has a positive impact on costs. Due to the low amount of force exerted, there is a handling advantage in that no tools, or few tools, need using when dismantling the formwork, and in that it is possible to dismantle the formwork under load without any prior releasing process.

Advantageously, the eccentric lever is rotatably secured to the support base by means of the pivot bearing. In the process, forces bearing on the lifting piston are transferred to the support base by means of the pivot bearing. On the support base, the pivot bearing can be formed by a simple hole, similarly to a plain bearing.

Very advantageously, a con rod element is movably secured to the eccentric lever, the lifting piston being movably connected to the support base by means of the con rod element and the eccentric lever. In the process, the con rod element and the eccentric lever form a flap tile or toggle lever. The eccentric lever can be movably connected to the lifting piston by means of the con rod element. The lifting piston and the eccentric lever thus need not be in direct contact in the working position. The support against one another can be provided, for example, indirectly by means of the con rod element. In this way, when the lifting piston is pushed out of the support base into the working position, the eccentric lever is automatically moved into a position in which its center of gravity is positioned between the rotary spindle of the pivot bearing and the lifting piston. Particularly simple handling of the lowering device during construction of a ceiling formwork is thus possible.

If an in particular pin-like support shaft is mounted in the pivot bearing, with the eccentric lever forming a crankshaft together with the support shaft, a larger lifting path between the working position and the lowered position of the lifting piston can be achieved. In the crankshaft, the support shaft and the eccentric lever are split, the con rod element being rotatably secured between the two parts of the eccentric lever. The pin-like nature of the support shaft leads to a particularly sturdy design of the locking apparatus, such that high supporting loads can be dissipated.

In a particularly advantageous embodiment of the lowering device according to the invention, the locking apparatus has an eccentric-lever holding apparatus. By means of this holding apparatus, the position of the eccentric lever can be held in the working position when the lifting piston is being positioned. This makes it possible to prevent the lifting piston inadvertently sliding into the lowered position due to the unintentional destruction of the unstable equilibrium of the lifting piston supported on the eccentric lever. The eccentric-lever holding apparatus can be released very simply since the ceiling formwork does not exert any direct load on the eccentric-lever holding apparatus.

In very simple terms, the eccentric-lever holding apparatus can have a slide and/or a pin. The slide and/or pin can be arranged next to the eccentric lever and/or con rod such that the freedom of movement thereof is impeded by turning the eccentric lever in the pivot bearing. The working position can thus be exited only by removing the pin or sliding the slide.

Advantageously, the slide can have a cuneiform end region for rotating the eccentric lever in the pivot bearing. In this way, in addition to unblocking the mobility of the eccentric lever, the unstable equilibrium in which the lifting piston is found when in the working position can be destroyed by sliding the slide.

If the eccentric-lever holding apparatus has a return spring, the slide being secured to the support base by means of the return spring, the slide can be automatically pressed into a position that locks the mobility of the eccentric lever when the lifting piston is slid into the working position.

Advantageously, the slide has a visible marking for distinguishing between the lowered position and the working position. In this way, the slide position that locks the eccentric lever can be reliably checked even when the support base is formed as a closed housing. To allow the slide to be slid in a simple manner, it can have a tool engagement groove.

The lowering device as a whole can consist of metal. According to an alternative embodiment, the lowering device consists at least in part, preferably mostly, most preferably entirely, of plastics material or a composite material. Possible composite materials are in particular fiber composite materials having or not having intermediate reinforcement layers.

If the lowering device only has to have a stroke (lowering path) of a few millimeters, the lowering device can be formed in a particularly compact manner. Its integration in or coupling to support apparatuses, e.g. construction struts or supporting scaffolds, can thus be simplified even further.

For better fitting of the support base and/or the lifting piston, they can each form a support head at one end, the support head preferably having a roller. Due to a roller of this kind, the lowering device according to the invention is particularly suitable for use in ceiling formwork for the underside of a carriageway slab. If the lowering device has stop knobs, in particular between the support base and support head of the lifting piston, it is possible to damp any striking of the support head on the support base when the ceiling formwork is lowered. If the support head abuts the stop knobs, is formed between the support head and the support base, which can be used for tool engagement for a levering tool. As a result, the lifting piston can be moved into its disengaged (forward-stroke) position in the event of a fall.

The support base can have a biasing spring, the lifting piston being pressed into the working position by means of the biasing spring. In this way, for example, the construction of a ceiling formwork can be made simpler by a lowering device according to the invention.

According to the invention, the lowering device can have an actuation means that can be accessed or actuated from the exterior and by means of which the lowering device can be activated, i.e. the lowering/sliding of the lifting piston into the support base can be triggered. The actuation means can in particular be in the form of a strike plate or a strike button that is preferably movable in a direction that is radial with respect to the longitudinal axis of the lowering device. As a result, the handling of the lowering device can be simplified even further.

The support apparatus according to the invention is intended for use in the construction sector, in particular for supporting a ceiling formwork. According to the invention, the support apparatus is characterized by at least one lowering device as explained above. The statements made above with regard to the lowering device apply equally to the support apparatus. Overall, therefore, the support apparatus can contribute to lower construction costs in the building trade.

According to the invention, the support apparatus can be a construction strut, in particular a heavy-load strut, a supporting scaffold, in particular in the form of a shoring tower, a truss-out or another common load-bearing apparatus familiar to a person skilled in the art of developing load-bearing structures in the construction sector.

According to the invention, the lowering device can, for example, be fitted as an (upper) extension and/or as a supporting plinth of a construction strut/heavy-load strut. To secure the lowering device to a strut of this kind, a plug-in connection and/or a screw connection can be used.

Particularly preferably, the lowering device is formed at least in part as an integral component of the support apparatus. For example, a tubular profile of the construction strut or supporting scaffold can form the support base of the lowering device. The lowering mechanism is thus arranged within the outer tube in a protected manner. If the support apparatus is in the form of a scaffold or shoring tower, the support apparatus can be provided with a plurality of lowering devices.

A ceiling formwork according to the invention has a lowering device according to the invention and a form lining element, the form lining element being supported by means of the lowering device, in particular by the lifting piston thereof. A ceiling formwork of this kind can be lowered securely and quickly when dismantling the formwork from the structure ceiling for which the formwork was erected.

If the form lining element forms an underside of a carriageway slab and the lowering device is arranged in a carriageway slab truss-out, casting the concrete for a bridge having a carriageway slab can be simplified by means of the lowering device according to the invention.

Further advantages of the invention become clear from the description and the drawings.

BRIEF DESCRIPTION OF THE DRAWINGS

Specific embodiments of the present invention will be explained in more detail below with reference to the accompanying drawings. The embodiments shown and described should not be taken to be an exhaustive list, but rather are intended as examples for outlining the invention.

In the drawings:

FIG. 1a to 3b are views and sections in various planes of a lowering device according to the invention having a slide as an eccentric-lever holding apparatus, the lifting piston being shown in the lowered position, the working position and in its transition from the working position to the lowered position;

FIG. 6b shows the carriageway slab truss-out having the lowering device according to the invention as shown in FIG. 6a.

DETAILED DESCRIPTION

FIG. 1a to 3b show a lowering device 10 according to the invention comprising a slide 12 as an eccentric-lever holding apparatus in side views and in various sectional planes. The lowering device 10 has a longitudinal axis (denoted by L), a lifting piston 14 and an eccentric lever 16. The lifting piston 14 and the position of the eccentric lever 16 are shown in the lowered position in FIGS. 3a and 3b, in the working position in FIGS. 1a and 1b, and in their transition from the working position to the lowered position in FIGS. 2a and 2b.

Figure 1A:
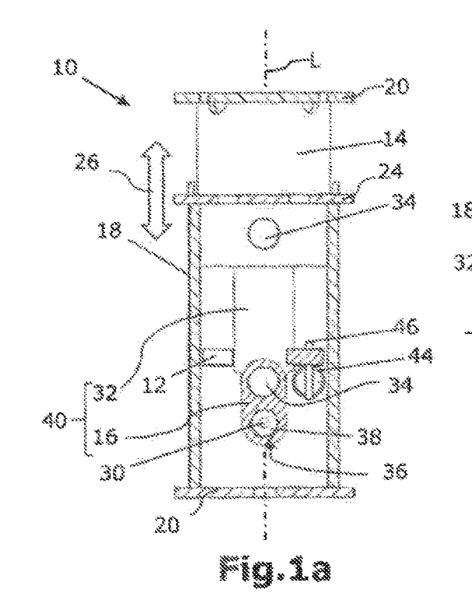
Figure 1B:
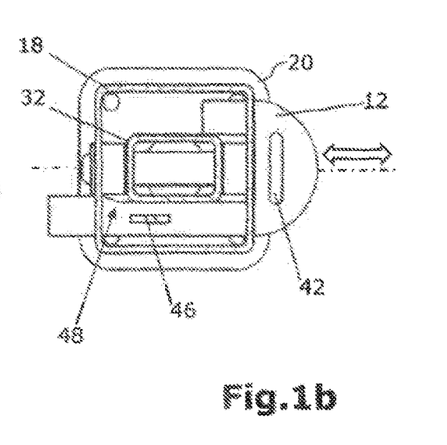
Figure 1C:
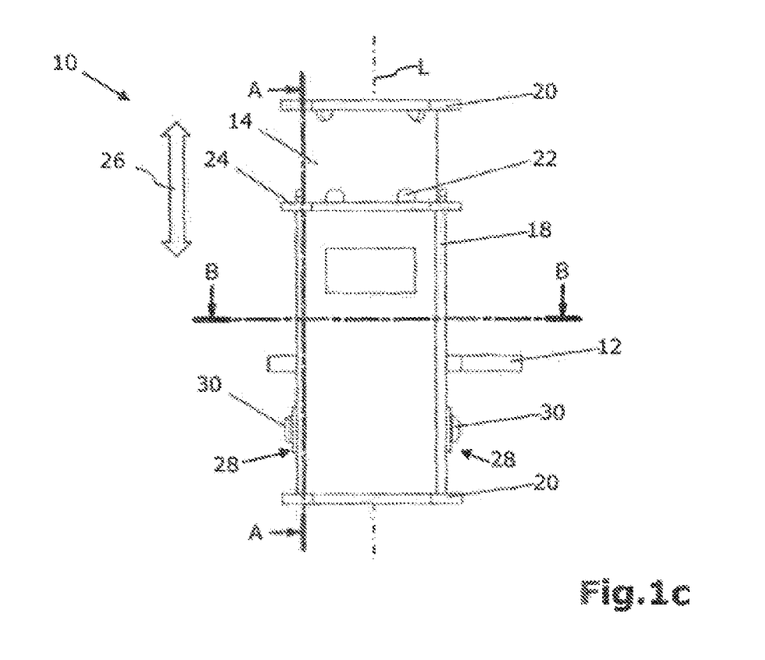
Figure 2A:
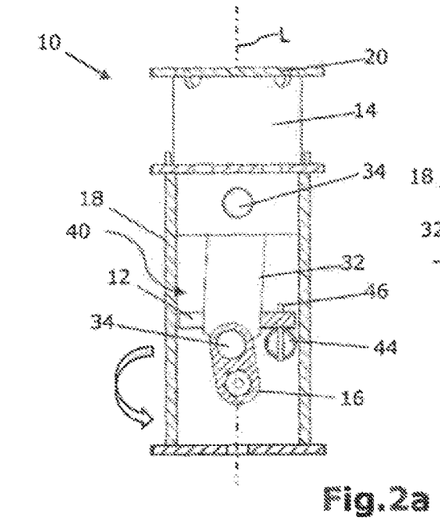
Figure 2B:
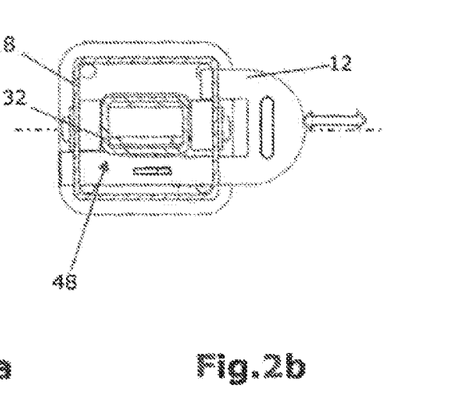
Figure 3A:
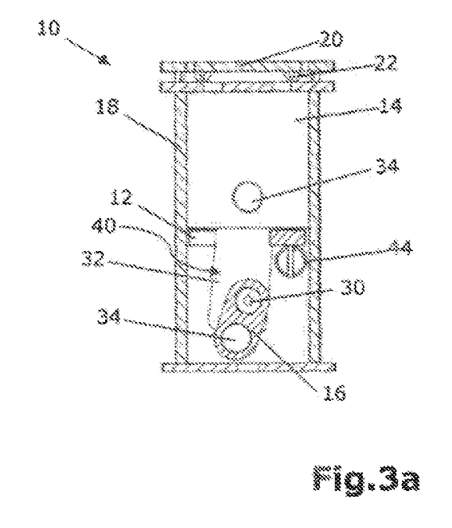
Figure 3B:
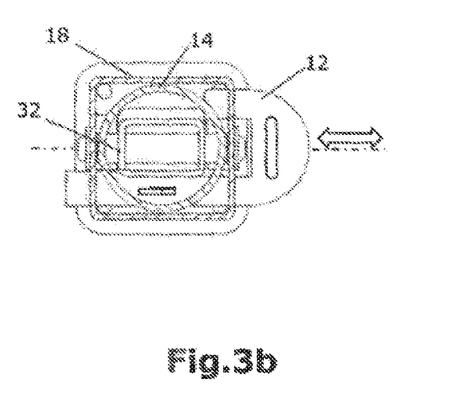

The sectional views are each shown in line with the sectional planes marked in the view of the lowering device 10 according to the invention in FIG. 1c. FIGS. 1a, 2a and 3a are sectional views along the sectional plane A-A, and FIGS. 1b, 2b and 3b are sectional views along the sectional plane B-B. In the sectional plane A-A, the position of the eccentric lever 16 is clearly discernible, and the associated position of the slide 12 is clearly discernible in the sectional plane B-B.

The support base 18 can be in the form of a housing that encloses the mechanism of the locking apparatus in a protective manner. At their free ends, both the support base 18 and the lifting piston 14 have a terminal plate, each of which forms a support head 20.

At the end of the support base 18 facing the lifting piston, stop knobs 22 can be arranged between the support base 18 and the support head 20 of the lifting piston 14. The stop knobs 22 can be welded to an end plate 24 of the support base 18, for example. The end plate 24 has an opening (not shown in the drawings) that is formed in accordance with the circumferential shape of the cross section of the lifting piston 14 and through which the lifting piston 14 is pushed. The cross-sectional shape of the lifting piston 14 can, for example, be circular. However, embodiments having a different, in particular polygonal, preferably rectangular, cross-sectional shape can also be used. The direction of the displaceable mounting of the lifting piston 14 in the support base 18 is shown symbolically by a double arrow 26. The lifting piston 14 can be slid from its pushed-out working position shown in FIG. 1 into the lowered position shown in FIG. 3 in a direction that is axial with respect to the longitudinal axis L, and can be locked in the pushed-out working position by means of the locking apparatus.

In the housing forming the support base 18, two opposing pivot bearings 28 are made as holes. The eccentric lever 16 is rotatably secured in these pivot bearings 28. For this purpose, an end of a pin-like support shaft 30 can be mounted in each pivot bearing 28, the eccentric lever 16 being secured to the support shaft 30.

The axial height of the lowering device 10 can be, for example, 270 mm when the lifting piston 14 is arranged in the working position, and 216 mm when the lifting piston 14 is arranged in the lowered position, resulting in a 54 mm lowering path. The lowering device 10 can, for example have a weight of 6.5 kg, in which case a load-bearing capacity of 50 kN can be ensured. If the lowering device 10 is used to support a formwork, in particular a ceiling formwork, it is possible to quickly dismantle the formwork under load, i.e. even when the freshly cast concrete pressure is high, while still actuating the lowering device 10 in an approximately load-free manner.

FIGS. 1a and 1b show a lowering device 10 according to the invention having a lifting piston 14 arranged in the working position, i.e. the position maximally disengaged from the support base 18 (=forward-stroke position). In other words, the lowering device is in its supporting-function position. The parts of the locking apparatus, e.g. the eccentric lever 16, are positioned accordingly. The eccentric lever 16 rotatably secured in the pivot bearings 28 on the support base 18 is movably connected to the lifting piston 14 by means of a con rod element 32. For this purpose, the eccentric lever 16 and the lifting piston 14 each have a hole, which are used as further pivot bearings. In each of its end regions, the con rod element 32 has a pin-like rotary spindle 34. The two rotary spindles 34 are each mounted in one of the further pivot bearings of the eccentric lever 16 and lifting piston 14.

The center of gravity of the eccentric lever 16 is located outside the rotary spindle (formed by the support shaft 30) of the eccentric lever 16, between the lifting piston 14 and the rotary spindle of the eccentric lever 16.

In FIG. 1a, the hub 36 of the rotary spindle of the support shaft 30, and thus of the eccentric lever 16, and a screw nut 38 for the securing thereof, can be seen. The lifting piston 14, the con rod element 32 and the eccentric lever 16 are arranged similarly to the construction of a reciprocating engine, with the con rod element 32 and the eccentric lever 16 forming a toggle lever 40, by means of which the lifting piston 14 is movably connected to the support base 18. In the working position shown, the lifting piston 14 and the support base 18 are supported against one another by means of the eccentric lever 16. In the illustrated embodiment of the lowering device 10 according to the invention, this is done by means of the connection to the con rod element 32.

The lowering device 10 according to the invention thus has a support base 18, formed as a housing, having stop knobs 22 on its top side, and has a ram formed by the lifting piston 14. Said ram is mounted in the housing so as to be slidable in the axial direction. The lifting piston 14 and the support base 18 are interconnected by means of the toggle lever 40. A lifting movement of the lifting piston 14 is thus limited upwards by the toggle lever 40 and downwards by the stop knobs 22 on the housing. The toggle lever 40 is composed of a kind of loosely assembled crankshaft, formed by the eccentric lever 16 and its rotary spindles, i.e. the support shaft 30 and the pin-like rotary spindle 34, by means of which the con rod element 32 is secured to the eccentric lever 16, and of the con rod element 32, which sits centrally on the crankshaft thus formed.

In the crankshaft, the support shaft 30 and the eccentric lever 16 are split in two, the con rod element 32 being rotatably secured between the two parts of the eccentric lever 16 by means of a rotary pin connecting the two parts of the support shaft 30. The rotary pin is formed by the pin-like rotary spindle 34, by means of which the con rod element 32 is secured to the eccentric lever 16. As components for designing the crankshaft, two single-shear spindles, two eccentric plates forming the eccentric element 16 and one two-shear spindle can be used.

FIG. 1b shows the position of the slide 12 in the illustrated working position. The slide 12 has a U-shaped basic shape, i.e. a U-shape having legs of different lengths. It is pushed into the support base 18 through slots therein, perpendicularly to the direction in which the lifting piston can be slid. The retraction and extension direction of the slide 18 is shown schematically in the figure by a double arrow (not referred to any further). In the region of the slide 12 arranged outside the support base 18 forming the housing, the slide can have a tool engagement groove 42. The long leg of the slide 12 is in direct contact with a side of the con rod element 32. On the opposite side, the con rod element 32 is also in direct contact with the short leg of the slide 12. The con rod element 32 can thus be blocked in terms of its mobility by the slide 12 which, in the position shown, directly abuts said element on either side. By means of the con rod element 32, the eccentric lever secured thereto is also blocked in terms of its mobility. The slide 12 therefore holds the eccentric lever in the position it is in at that moment, thus forming an eccentric-lever holding apparatus. By means of the slide 12, which extends transversely to the con rod element 32, a movement of the crankshaft when the con rod element 32 and the crankshaft are in the vertically extended position, i.e. when the lifting piston 14 is at maximum stroke, can thus be either blocked or unblocked. As a result of a downward movement of the crankshaft, the lifting piston 14 is also lowered, under the effect of gravity.

The eccentric-lever holding apparatus formed by the slide 12 can have a return spring 44 (integrated spring return), the slide 12 being secured to the support base 18 by means of the return spring 44, e.g. via a securing peg 46. In addition, a visible marking for distinguishing between the lowered position and the working position can be marked on the slide 12. This visible marking can, for example, consist of a red and a green visual panel attached to the free end of the long leg of the slide 12, and depending on the position of the slide 12 either only the red visual panel or both the red and green visual panels come to be located outside the housing.

In accordance with FIG. 1b, the slide 12 has a cuneiform end region 48 for rotating the eccentric lever 16 in its pivot bearing. In the embodiment shown, this can be done by engaging the cuneiform end region 48 with the con rod element 32. By pressing the con rod element 32 out of the position shown, the eccentric lever 16 is also rotated in its pivot bearing. The longer leg of the slide 12 can thus be cuneiform and provided with a colored marking.

FIG. 1c shows the hub, which is arranged outside the support base 18, of the rotary spindle of the support shaft 30 on which the eccentric lever 16 is e.g. molded for rotatably securing said lever in the pivot bearings 28.

FIGS. 2a and 2b show the lowering device 10 according to the invention in the transition from the working position to the lowered position. In other words, the lifting piston 14 is located between the working position and the lowered position, and the parts, e.g. the eccentric lever 16 and the con rod element 32, of the locking apparatus are positioned accordingly or are found in a transition phase indicated in FIG. 2a by a rounded arrow.

FIG. 2b shows how the slide 12, which has been partly withdrawn sideways out of the support base 18, is no longer in contact with the con rod element 32 on the side of its short leg. Movement of the toggle lever 40 and thus of the eccentric lever 16 is thus unblocked. By means of the cuneiform end region 48 of the long leg of the slide 12, the con rod element 32 is pressed out of its (stable) equilibrium position, towards the left in the drawing. As a result, the eccentric lever 16 is also pressed out of its equilibrium position towards the left. Due to gravity, or under load, the lifting piston 14 is thus lowered into the lowered position. In the process, the eccentric lever 16 performs a rotation in its pivot bearing by up to 180° in the direction of the indicated arrow. The crankshaft thus performs half a rotation.

FIGS. 3a and 3b show the lowering device 10 according to the invention (rapid lowering) in its lowered position. In other words, the lifting piston 14 is in the lowered position (=backward-stroke position), and the parts, e.g. the eccentric lever 16 and the con rod element 32, of the locking apparatus are positioned accordingly. FIG. 3a shows that the lifting piston 14 is pushed maximally into the support base 18. In the process, the terminal plate forming the support head 20 of the lifting piston 14 rests on the stop knobs 22 on the support base 18. The eccentric lever 16 is rotated in its pivot bearing approximately 180° about the axis of rotation of the support shaft 30. The center of gravity of the eccentric lever 16 is located below this axis of rotation. FIG. 3b shows that the slide 12, which has been retracted back into the support base 18 by the return spring, strikes the con rod element 32 on its short leg, such that, when in this position, the slide 12 cannot be fully returned into its original position according to FIG. 1b. In addition, the circular cross section of the pushed-in lifting piston 14 can be seen in this sectional image.

Rapid lowering using the lowering device 10 according to the invention as illustrated is thus carried out as follows. In the working position, the ram, i.e. the lifting piston 14, is maximally disengaged, i.e. pushed out of the support base 18. In other words, the lowering device is in its supporting-function position. The slide 12 holds the con rod element 32 and crankshaft in a perpendicular position, possibly tilted slightly forwards by approximately 1°, in which the slide 12 is supported against the support base 18 by means of the con rod element 32 and the eccentric lever 16. This position is referred to as the equilibrium position or dead position of the toggle lever 40. Due to this extended toggle lever position, the loads (from the freshly cast concrete) exerted on the lowering device 10 are absorbed by the ram and dissipated into the support base 18 forming the housing directly through the con rod element 32 and the crankshaft. Owing to the favorable toggle lever position, the slide 12 remains practically load-free and can thus always be actuated in a simple manner, i.e. without high force exertion, when in the loaded state; in other words it can be withdrawn into its unblocked position. From the exterior, a green colored marking can be seen on the long leg of the slide 12 protruding out of the housing. This indicates that the toggle lever mechanism, i.e. the locking apparatus, is secured and thus that the lowering function is active, i.e. that rapid lowering can take place by withdrawing the slide 12.

To unlock the rapid lowering, the slide 12 is simply slid counter to its spring return. By way of example, a hammer and/or a nail puller or crowbar can also be used for this mechanical sliding. As a result, the con rod element 32 and the crankshaft are unblocked on one side, on the slide side having the shorter leg. The lowering is initiated by sliding the slide 12 further. Its cuneiform end region 48 now passes the dead position of the toggle lever 40 unless it has already done so automatically due to the forward tilting. The con rod element 32 and the crankshaft bend inwards and the axially oriented lowering movement of the ram begins, with assistance from gravity, as shown in FIG. 2a.

Before the crankshaft can complete its half-rotation during the downward movement of the lifting piston 14, the lifting piston 14, i.e. its support head 20, hits the stop knobs 22 on the top of the housing of the support base 18. This ensures that the toggle lever mechanism remains entirely load-free during the formwork-dismantling movement. The housing thus absorbs all the potential energy being released due to the position change and transfers the resulting lowering load, which, in the case of supporting a (ceiling) formwork, substantially corresponds to the dead weight of the (ceiling) formwork, to the ground/sub-floor or to the lowering device 10 or a support apparatus provided with the lowering device in the form, for example, of a construction strut, a shoring tower or a truss-out.

The return spring 44 integrated in the housing, e.g. in the form of a compression spring, pulls the slide 12 back into the housing as far as to the stop on the con rod element 32. From the exterior, only the red colored marking is now visible, indicating that the formwork-dismantling movement is complete and the lowering function is thus inactive. When dismantling the formwork from a (ceiling) formwork supported by the lowering device 10, a resultant clearance of approximately 5 cm is produced between the lower edge of the concrete ceiling and the upper edge of the ceiling formwork, corresponding to the maximum lifting path of the lifting piston 14 in the support base 18. Before being used again, the rapid lowering must be manually reset (re-armed) in order to be functional.

Figure 4:
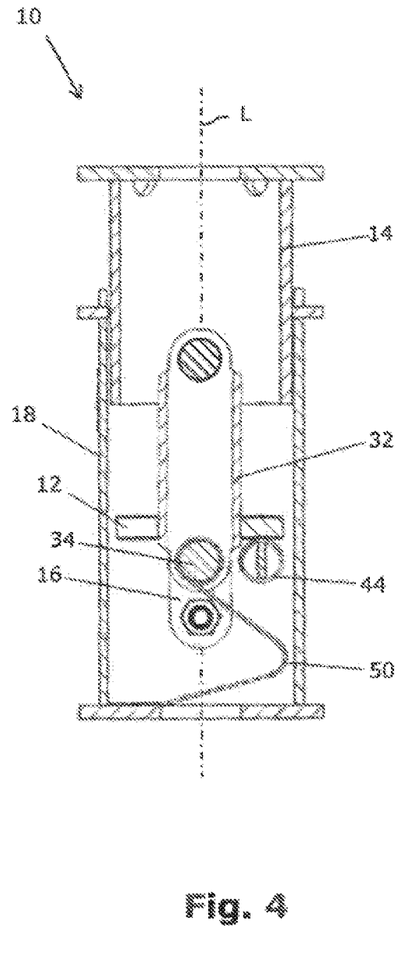
FIG. 4 shows an embodiment of a lowering device according to the invention having a biasing spring for the lifting piston.

FIG. 4 shows an embodiment of a lowering device 10 according to the invention having a biasing spring 50 for the lifting piston 14. The embodiment substantially corresponds to the embodiment shown in FIG. 1a to 3b, although a biasing spring 50 (in this case in the form of a strip spring by way of example) is additionally installed in the housing forming the support base 18. The biasing spring 50 is secured to the crankshaft pivot pin 34 to which the con rod element 32 is rotatably secured. This pivot pin 34 connects the two parts of the eccentric lever 16. The biasing spring 50 presses the crankshaft, and thus the lifting piston 14, into the working position as soon as the lowering device 10 is unloaded, i.e. in a load-free state. By means of its spring return 44 (which is provided anyway), the slide 12 automatically blocks the toggle lever 40, and thus the eccentric lever 16, after the lifting piston 14 is pressed back into the working position from the lowered position. As a result, by means of its spring return (which is provided anyway), the slide 12 blocks the toggle lever mechanism in its maximum position that it assumes when the lifting piston 14 is in the working position, i.e. in the equilibrium position or dead position of the toggle lever 40. Automatic activation of the rapid lowering can thus be implemented. From the exterior, the green colored marking is visible again to indicate that the lowering function is active.

Figure 5:
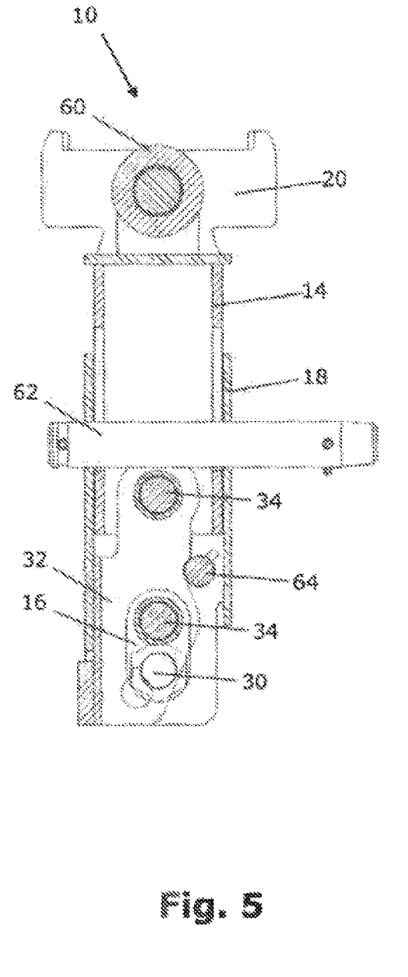
FIG. 5 shows a further embodiment of a lowering device according to the invention that is particularly suitable for use in a ceiling formwork for a carriageway slab in bridge construction.

The support head 20 of the lifting piston 14 can have a roller 60, as is the case in the embodiment of the lowering device 10 according to the invention shown in FIG. 5. By means of a roller 60 of this kind, a beam of a ceiling formwork, for example, can be guided in a progressive concrete casting process, i.e. an incremental launching system as commonly used in bridge construction. In the lowering device according to FIG. 5, an additional guide pin 62 is guided through pin guide holes in the support base 18 and guide slots in the lifting piston 14. A locking pin 64 is guided through additional drilled bores in the support base 18 as the eccentric-lever holding apparatus. The locking pin 64 directly abuts one side of the con rod element 32. On the opposite side of the con rod element 32, this element directly abuts the support base 18. As a result, the con rod element 32 is locked in the working position when the lifting piston 14 is in the position shown. If the locking pin 64 is withdrawn from the support base 18, the con rod element 32 can tip to the right in the drawing. To destroy the unstable equilibrium of the lifting piston 14, the lowering device 10 can have an actuation means 66 accessible from the exterior (in this case in the form of a strike plate). The strike plate can in particular be secured to, in particular molded on, the con rod element 32. If the strike plate is moved inwards in a direction that is radial with respect to the longitudinal axis L of the lowering device 10, the lowering movement of the lifting piston 14 is initiated as a result.

The toggle lever 40, which is formed by the con rod element 32 and eccentric lever 16, which are movably interconnected by means of a pivot bearing and a pivot pin 34, can tip accordingly, as a result of which the crankshaft formed by the support spindle 30 and the eccentric lever 16 performs a rotation in its pivot bearing and the lifting piston 14 is slid into the lowered position in the axial direction.

According to an embodiment of the invention not shown in more detail in the drawings, the actuation means 66 can also be used to unblock a spring-loaded strike pin such that said pin is accelerated in the direction towards and counter to the con rod element 32 or eccentric lever 16, so as to thus destroy the unstable equilibrium of the lifting piston and initiate the lowering movement of the lifting piston 14. It goes without saying that both the spring element used to accelerate the strike pin and its weight have to be configured to have a sufficiently large pulse to trigger the lowering movement. In this design, the lowering device can be activated particularly conveniently and potentially without the use of a tool such as a hammer or the like.

Figure 6A:
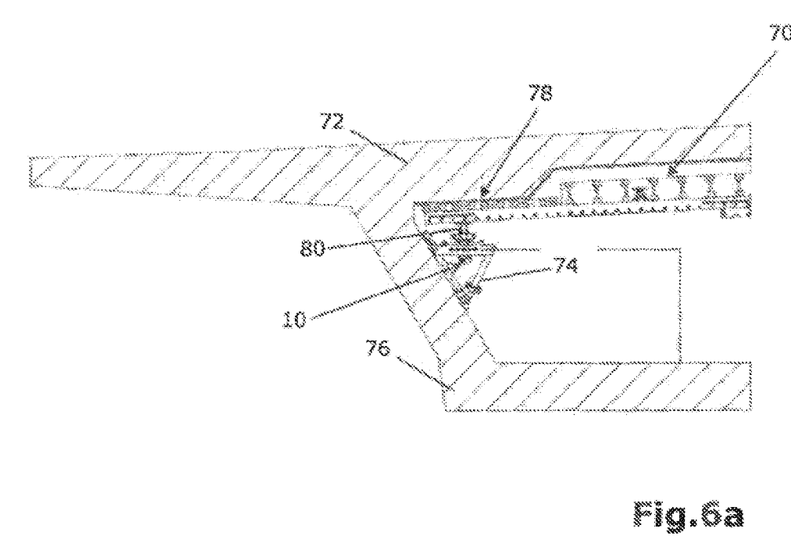
FIG. 6a shows a formwork of a carriageway slab of a bridge with the lowering device according to the invention from FIG. 5 installed in a support apparatus formed as a carriageway slab truss-out.

FIG. 6a shows a ceiling formwork 70 of a carriageway slab 72 of a bridge with the lowering device 10 according to the invention from FIG. 5 installed in a support apparatus 74 formed as a carriageway slab truss-out. The carriageway slab truss-out is fixedly screwed, e.g. by means of a tie bolt, to a side wall of a box-frame construction 76 cast beneath the carriageway slab 72 for e.g. reinforcement purposes. A form lining element 78 is supported by means of the lowering device 10. Between the roller of the support head of the lowering device 10 fitted in the carriageway slab truss-out 74 and the form lining element 78, a beam 80 is guided. The form lining element 78 forms an underside of the carriageway slab 72, the lowering device 10 being arranged in a carriageway slab truss-out. The lowering device 10 is thus integrated in the support apparatus 74, configured as a carriageway slab truss-out, so as to form an incremental launching system for bridge construction.

Figure 6B:
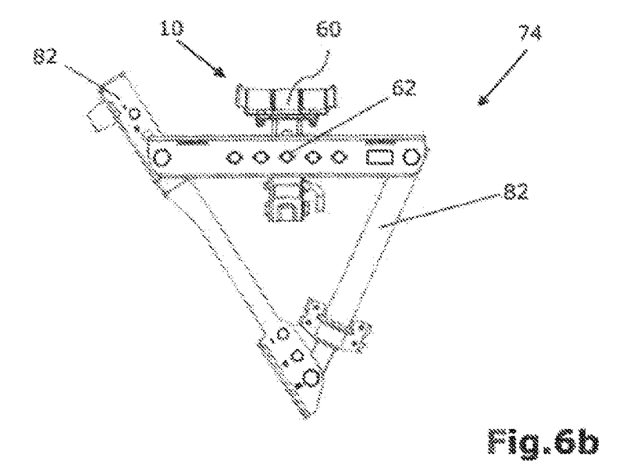

FIG. 6b shows the carriageway slab truss-out having the lowering device 10 according to the invention, as shown in FIG. 6a, comprising a roller 60. The carriageway slab truss-out is formed by a triangular steel girder construction 82 having holes forming various screw-connection options. The lowering device 10 according to the invention is secured at one of these holes by the guide pin 62. The steel girder construction can be set such as to be adjustable to different tilt angles of side walls of the box-frame construction, as shown in FIG. 6a.

Figure 7:
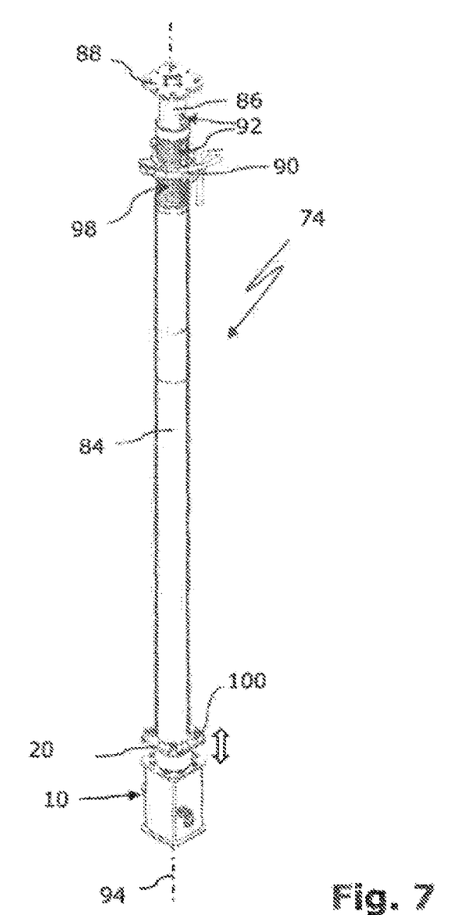
FIG. 7 is a perspective view of a support apparatus in the form of a construction strut provided with a lowering device according to FIG. 1a to 3b.

FIG. 7 shows a further support apparatus 74 in the form of a telescopic construction strut. The construction strut has an outer tube 84, in which an inner tube 86 is guided in a longitudinally slidable manner. At its free end, the inner tube 86 is provided with a head plate 88. To set the length of the construction strut, a plug-in pin 90 is used in this case, which passes through through-openings 92 in the outer tube 84 and inner tube 86. The plug-in pin 90 is supported on a locknut 96 in a direction that is axial with respect to the longitudinal axis 94 of the support apparatus 74. The locknut 96 engages in an external thread 98 of the outer tube 84. Purely by way of example, the lowering device 10 is secured to the bottom of the support apparatus 74. For this purpose, the support head 20 of the lowering device 10 is screwed to the baseplate 100 of the construction strut or secured to the baseplate 100 in another way. It goes without saying that the lowering device 10 can also be secured to the head plate 88 of the construction strut.

The invention relates to a lowering device 10, in particular for lowering ceiling formworks 70 when dismantling the formwork from a structure ceiling, comprising a lifting piston 14, a support base 18 and a locking apparatus, the lifting piston 14 being slidably mounted in the support base 18 and being able to be slid from a pushed-out working position into a lowered position, and being able to be locked in the pushed-out working position by means of the locking apparatus. The locking apparatus has a pivot bearing and an eccentric lever 16, the eccentric lever 16 being rotatably secured in the pivot bearing, and the lifting piston 14 and the support base 18 being supported against one another by means of the eccentric lever 16 when the lifting piston 14 is in the working position, i.e. the forward-stroke position, or when the lowering device 10 is in the supporting position.

The invention claimed is:

1. A lowering device comprising a lifting piston, a support base and a locking apparatus, wherein the lifting piston is slidably mounted in the support base and can be slid from a pushed-out working position into a lowered position and can be locked in the pushed-out working position by means of the locking apparatus, wherein the locking apparatus has a pivot bearing and an eccentric lever, wherein the eccentric lever is rotatably secured in the pivot bearing, and the lifting piston and the support base are supported against one another in the working position by means of the eccentric lever, wherein a con rod element is movably secured to the eccentric lever, the lifting piston being movably connected to the support base by the con rod element and the eccentric lever, wherein the con rod element has two rotary spindles at respective end regions of the con rod element, wherein the two rotary spindles are each mounted in one of the pivot bearings of the eccentric lever and lifting piston.

2. The lowering device according to claim 1, wherein the eccentric lever is rotatably secured to the support base by means of the pivot bearing.

3. The lowering device according to claim 1, wherein a support shaft is mounted in the pivot bearing, the eccentric lever forming a crankshaft together with the support shaft.

4. The lowering device according to claim 1, wherein the locking apparatus has an eccentric-lever holding apparatus.

5. The lowering device according to claim 4, wherein the eccentric-lever holding apparatus comprises a slide or a locking pin.

6. The lowering device according to claim 5, wherein the slide has a cuneiform end region for rotating the eccentric lever in the pivot bearing.

7. The lowering device according to claim 1, wherein the eccentric-lever holding apparatus has a return spring, the slide being secured to the support base by means of the return spring.

8. The lowering device according to claim 1, wherein the slide has a visible marking for distinguishing between the lowered position and the working position.

9. The lowering device according to claim 1, wherein the slide has a tool engagement groove.

10. The lowering device according to claim 1, wherein the lowering device has an actuation means, in the form of a strike plate accessible from the exterior, the lowering device being able to be activated by the actuation of said actuation means.

11. The lowering device according to claim 1, wherein the support base and/or the lifting piston form a support head at one end, the support head preferably having a roller.

12. The lowering device according to claim 11, wherein stop knobs are provided on the end of the support base facing the lifting piston.

13. The lowering device according to a claim 1, wherein the support base has a biasing spring, the lifting piston being pressed in the direction of the working position by means of the biasing spring.

14. A support apparatus for the construction sector, comprising:
at least one of the lowering device according to claim 1.

15. The support apparatus according to claim 14, wherein the support apparatus is a construction strut comprising a heavy-load strut.

16. A ceiling formwork, comprising:
a lowering device according to claim 1; and
a form lining element, wherein the form lining element is supported by the lowering device.

17. The ceiling formwork according to claim 16, wherein the form lining element forms an underside of a carriageway slab, the lowering device being arranged on a support apparatus configured as a carriageway slab truss-out.

18. The lowering device of claim 1, wherein the two rotary spindles are pin-shaped.

19. A lowering device, comprising:
a support base;
a lifting piston slidably mounted in the support base and being slidable from a pushed-out working position into a lowered position;
a locking apparatus configured to lock the lifting piston in the pushed-out working position, the locking apparatus comprising:
a pivot bearing,
an eccentric lever rotatably secured in the pivot bearing, wherein the lifting piston and the support base are supported against one another in the working position by the eccentric lever, and
a con rod element having two rotary spindles at respective end regions and being movably secured to the eccentric lever, the lifting piston being movably connected to the support base by the con rod element and the eccentric lever.

* * * * *